May 22, 1923.  1,456,258

C. E. STONER

LATERAL DIRIGIBLE LIGHT FOR VEHICLES

Filed April 20, 1921

Witness:
L. Whipple.

Inventor:
Carlton E. Stoner.
by James R. Townsend
his atty

Patented May 22, 1923.

1,456,258

UNITED STATES PATENT OFFICE.

CARLTON E. STONER, OF LONG BEACH, CALIFORNIA.

LATERAL DIRIGIBLE LIGHT FOR VEHICLES.

Application filed April 20, 1921. Serial No. 462,938.

*To all whom it may concern:*

Be it known that I, CARLTON E. STONER, a citizen of the United States, residing at Long Beach, in the county of Los Angeles and State of California, have invented new and useful Improvements in Lateral Dirigible Lights for Vehicles, of which the following is a specification.

The invention is particularly applicable to the dirigible wheels of such a vehicle as an automobile and has for one of its objects to provide a lamp attachment which may be connected to the wheels in such a manner that the rays therefrom will be projected directly and unobstructed from the face of the wheel, thus revealing the roadway at the sides of the wheels to the driver of the vehicle and to an approaching driver in any position in which the wheels may be turned.

An object is to enable the driver of the vehicle to see the nature and contour of the ground adjacent the sides of his vehicle, for example, the proximity of a curb on a city street, or a precipice on a mountain road, thus lessening the danger when it is necessary to drive close thereto. Ordinary headlights are focused on the road ahead and do not illuminate the sides of the road close to the vehicle.

An object is to provide a lighting device by which position of the vehicle and the nature of the road in the vicinity thereof are revealed to an approaching driver, and whereby his side of the road is so illuminated, that when the lamps on his own headlight are dimmed, he can see to safely pass the vehicle equipped with my invention and to avoid accident from collision or rough road.

A feature of the invention is that the lights are mounted in the hubs of the wheels and are in protected position near the ground and may brightly illuminate the sides of the roadway where necessary.

An object is to afford an illumination, especially on foggy nights, by directing a strong light on the road side without any blinding effect on approaching drivers.

An object is to provide an arrangement whereby lamps on dirigible wheels of vehicles when turning a corner will direct a strong light on the corner at every angle of the turn with minimum likelihood of blinding the driver.

An object is to provide a dirigible wheel, axle or hub lamp, not subject to be easily knocked off and destroyed. Another object is to avoid complicated or numerous parts, and consequent likelihood of getting out of order.

An object of my invention is to produce a simple inexpensive device for lighting the road along and beside the way the wheels must travel, and which may be applied to vehicles now in use and which may be built in the hubs or axles of dirigible vehicles without danger of confusing the driver of the car or the driver of the cars he meets.

A further object is to so connect the lamp with the vehicle hub or axle that said lamp will be protected against dislodgment or injury.

An advantage is that by mounting the lights entirely within the hub caps no portion of the light projecting devices extending beyond the end of the hub caps, which protect the lamps from contact with curbings or such objects that may contact with the vehicle hubs that breakage of the lamps is thus reduced to a minimum; and the direct light from the lamp does not reach the eyes of the driver.

Other objects, advantages and features of invention may appear from the accompanying drawing, the subjoined detail description and the appended claims.

The accompanying drawing illustrates the invention.

Figure 1:
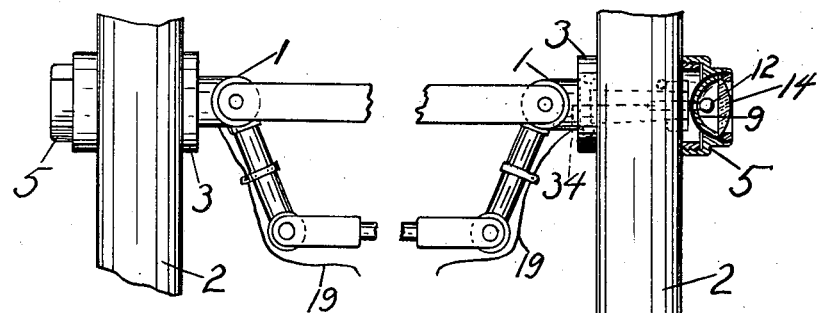
Figure 1 is a fragmentary view partly in section showing the arrangement of lamps in the hub of a vehicle.
Figure 2:
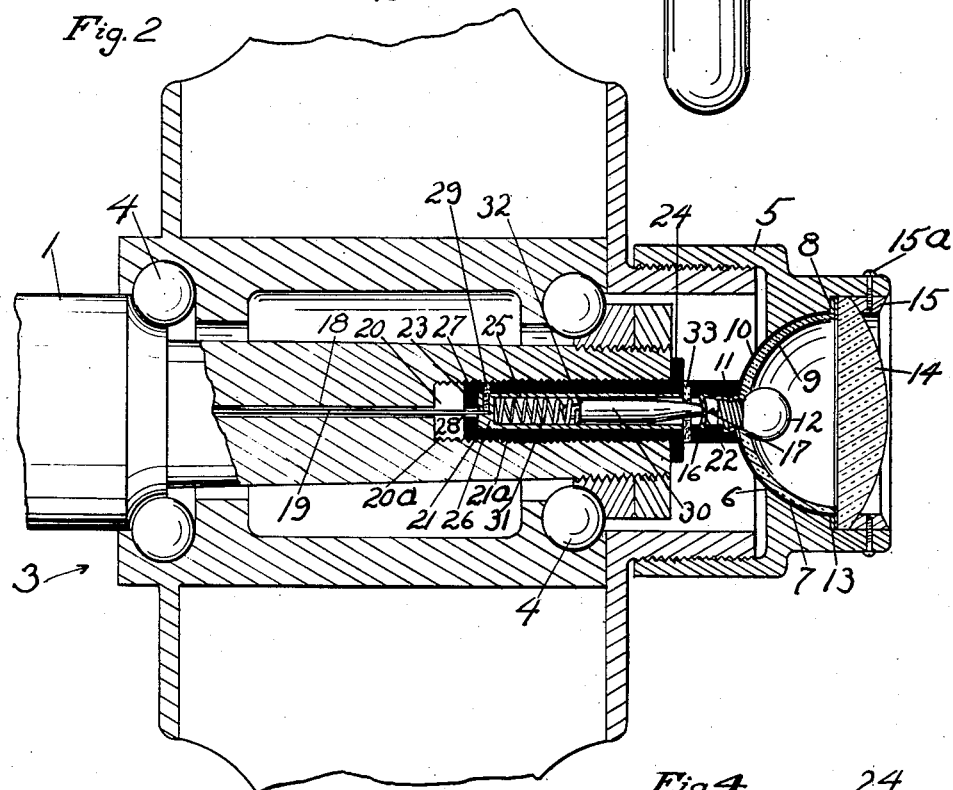
Fig. 2 is a longitudinal section through the hub on a larger scale, showing the arrangement of the lamp in the hub cap, and the electric connections therewith; the electric connections being shown on approximately a working scale and exaggerated relative to the hub.
Figure 3:
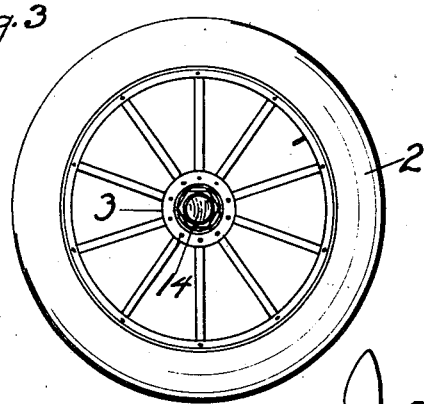
Fig. 3 is an elevation on smaller scale than Fig. 1, of a wheel of an automobile showing the lamp in place therein.
Figure 4:
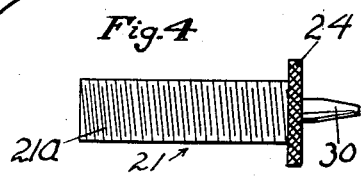
Fig. 4 is a detail view, of the contact brush and its surrounding casing.

1 designates the axle or spindle of a vehicle having wheels 2 mounted thereon by means of hubs 3. The hubs may be of any usual construction and may have ball bearings 4 or roller bearings to facilitate rotation on the axle. Hub caps 5 are screw threaded onto the ends of the hub, serving as a protection for the ends of the axles. The two ends of the axles being of similar construction, only one will be described.

The outer end of the cap 5 is apertured at 6 and is provided with a concave recess 7 expanding outward from said aperture and countersunk to form a lens seat 8. Conforming to the recess 7 is a reflector 9 having a metallic backing 10. The reflector 9 and the backing 10 are centrally apertured and the backing is provided with an inwardly extending internally threaded socket 11 arranged inwardly from said aperture and adapted to receive a suitable lamp, as an incandescent electric bulb 12. The backing 10 is also provided with a flange 13 adapted to be seated against the shoulder 8. A lens 14 preferably of the plano-convex type, is seated against the flange 13 and the flange 13 and lens 14 may be held against the shoulder by a ring 15 and screws 15ª.

Surrounding the socket 11 is a tubular insulating sleeve 16 in the bore of which is secured a contact plate 22 of brass or other electrically conductive material and preferably concaved inwardly. The plate is preferably spaced a short distance from the end of the sleeve and is electrically connected to one terminal of the filament of the lamp by a conductor 17; the other terminal being grounded in any usual manner.

The axle 1 is provided toward its ends with central bores or conduits 18, to receive conductors 19, and the ends of the axle are counterbored concentrically with said conduits to form recesses 20 which have screw-threads 20ª formed therein.

The construction of the ends of the axle being similar, only one will be described.

Seated in the recess 20 is an insulating sleeve or casing 21 closed at its rear end to form an abutment wall 23 and having external screw threads 21ª adapted to cooperate with the threads 20ª to maintain the sleeve in place in the recess 20. The outer end of the sleeve 21 is preferably enlarged to form a shoulder which may be knurled as at 24 to facilitate its insertion and withdrawal from the recess 20. The bore of the sleeve 21 is provided with a tubular lining 25 of brass or other suitable electrically conducting material, and the tube is closed at its rear end by a wall 26 which is centrally recessed at 27 in its rear face. The abutment wall 23 is centrally apertured at 28 and the conductor 19 is passed through said aperture into said recess and is held in the recess by means of a set screw 29 countersunk into the sleeve 21.

Slidably mounted within the tube 25 and in contact therewith is a brush 30 of carbon or other electrically conductive material; the front end of the brush 30 being held in yielding contact with the plate 22 by means of a compression spring 31, the rear end of the brush being shouldered at 32 to receive one end of the spring, the other end of said spring being seated against the wall 26.

The gap between the sleeve 16 and the sleeve 21 is preferably filled by a washer 33 of felt or other yielding and insulating material which is designed to prevent foreign matter from working into the electric connections.

The conduits 18 may extend the whole length of the axle or may terminate a short distance from the wheels and the wires 19 may lead through side conduits 34 to a source of electricity, not shown.

In applying my invention to a vehicle, the conductor 19 is drawn through the conduit 18 and the end thereof extended beyond the end of the hub, so that it may be readily secured in the recess 27 by means of screw 29, after which the sleeve 21 is screwed into the socket 20. The lamp 12 and its accessories are placed in the cap 5 by means of ring 15 which is removably secured in recess 7 as set forth above, and the cap is then screwed in place as in the case of an ordinary hub cap. The contact plate 22 and the brush 30 contacting and forming a circuit when the current is turned on by a switch not shown.

The parts may be removed by an operation reverse to that described above and may be readily replaced when worn by new ones as will be readily understood from the above description.

As stated above the lights are preferably located in the dirigible wheels of the vehicle and when so placed serve to directly illuminate the road at the sides of said wheels. The lamps being in the hubs and near the ground, reveal the road so that the contour thereof may be readily observed. As the axes of the wheels are turned the source of light turns with them, illuminating bends or turns in the road. The terminals of the conductors 19 may be brought together on the dash board or in any position convenient to the driver and may be connected to any suitable switch mechanism by which the lights may be turned on or off at the will of the driver.

I claim:

1. The annular hub cap for vehicle wheels set forth, threaded onto the hub and having a recess and a countersunk portion; a light projecting device in said recess; a lens seated in said countersunk portion; and means to hold said lens in mounted position.

2. In combination with an axle for a vehicle having a socket at the end thereof; contact means seated in said socket; a wheel hub rotatably mounted on said axle; a hub cap for said hub; and a light projecting device mounted in said hub cap and having a contact plate adapted to contact with the contact means in said socket.

3. In combination with an axle of a vehicle having a recess; an insulating casing in said recess; a brush slidingly mounted in said casing; an electric source connected to said brush; a wheel having a hub rotatably mounted on said axle; a hub cap for said hub; and a light projecting device mounted in said hub cap and adapted to contact with said brush for the purpose set forth.

4. An axle for a vehicle and a hub mounted thereon, a lamp inset in the end of said hub; a cap for the hub, enclosing the lamp, with no portion of said lamp extending beyond the end of said cap; said axle having a brush therein adapted to contact with a contact device connected with said lamp; a reflector and lens inside the cap and surrounding the lamp, and means secured inside the cap to hold the lens and reflector in the cap.

In testimony whereof, I have hereunto set my hand at Los Angeles, California, this 14th day of March, 1921.

CARLTON E. STONER.

Witness:
JAMES R. TOWNSEND.